United States Patent
Pavageau et al.

(10) Patent No.: US 10,347,438 B2
(45) Date of Patent: Jul. 9, 2019

(54) ARC EXTINGUISHING GAS FILTERING DEVICE FOR ELECTRICAL CURRENT SWITCHGEAR AND ELECTRICAL CURRENT SWITCHGEAR COMPRISING THIS FILTERING DEVICE

(71) Applicant: Schneider Electric Industries SAS, Rueil Malmaison (FR)

(72) Inventors: Vincent Pavageau, Saint-Egreve (FR); Eric Domejean, Voreppe (FR); Marc Rival, Saint Ismier (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/940,153

(22) Filed: Mar. 29, 2018

(65) Prior Publication Data

US 2018/0301292 A1    Oct. 18, 2018

(30) Foreign Application Priority Data

Apr. 14, 2017   (FR) ...................................... 17 53310

(51) Int. Cl.
*H01H 9/34*   (2006.01)
*H01H 9/36*   (2006.01)
(Continued)

(52) U.S. Cl.
CPC ......... *H01H 9/342* (2013.01); *B01D 46/0032* (2013.01); *B01D 46/10* (2013.01);
(Continued)

(58) Field of Classification Search
CPC ........ H01H 9/342; H01H 9/362; H01H 9/346; H01H 2009/343; H01H 33/08; H01H 73/18; B01D 46/0032; F28F 13/08
(Continued)

(56) References Cited

U.S. PATENT DOCUMENTS

| | | | | | |
|---|---|---|---|---|---|
| 3,033,961 | A | * | 5/1962 | Carter | .................... H01H 9/342 |
| | | | | | 218/149 |
| 3,555,224 | A | * | 1/1971 | Frind | .................... H01H 9/342 |
| | | | | | 218/149 |

(Continued)

FOREIGN PATENT DOCUMENTS

| | | |
|---|---|---|
| DE | 10 2007 028 204 A1 | 12/2008 |
| EP | 0 022 708 A1 | 1/1981 |
| EP | 0 666 627 A1 | 8/1995 |

OTHER PUBLICATIONS

French Preliminary Search Report dated Dec. 14, 2017 in French Application 17 53310 filed on Apr. 14, 2017 (with English Translation of Categories of Cited Documents and Written Opinion).

*Primary Examiner* — Edwin A. Leon
*Assistant Examiner* — William A Bolton
(74) *Attorney, Agent, or Firm* — Oblon, McClelland, Maier & Neustadt, L.L.P.

(57) ABSTRACT

An arc extinguishing gas filtering device for electrical current switchgear includes a porous central body including longitudinal channels and transverse channels which fluidically connect the longitudinal channels together, the longitudinal channels having a bent form; and a tight outer skin which surrounds the central body and which includes inlet orifices and outlet orifices, each longitudinal channel extending between an inlet orifice and an outlet orifice, the outer skin and the central body forming a rigid part in a single piece produced in a metallic material.

9 Claims, 4 Drawing Sheets

(51) Int. Cl.
   *H01H 33/08*   (2006.01)
   *H01H 73/18*   (2006.01)
   *B01D 46/00*   (2006.01)
   *B01D 46/10*   (2006.01)

(52) U.S. Cl.
   CPC ............ *H01H 9/362* (2013.01); *H01H 33/08* (2013.01); *H01H 73/18* (2013.01)

(58) Field of Classification Search
   USPC .............................. 218/157, 155, 34, 35, 51
   See application file for complete search history.

(56) References Cited

U.S. PATENT DOCUMENTS

| | | | | |
|---|---|---|---|---|
| 3,621,169 | A * | 11/1971 | Heft ...................... | H01H 33/58 218/152 |
| 5,095,973 | A * | 3/1992 | Toy ...................... | F28D 9/0062 165/185 |
| 5,756,951 | A * | 5/1998 | Manthe .................. | H01H 9/342 218/150 |
| 6,784,393 | B2 * | 8/2004 | Bach ...................... | H01H 9/342 218/153 |
| 7,488,915 | B2 * | 2/2009 | Pollitt .................... | H01H 9/342 218/149 |
| 7,705,263 | B2 * | 4/2010 | Rane ........................ | H01H 9/34 218/149 |
| 7,708,794 | B2 * | 5/2010 | Dullien .............. | B01D 39/1623 55/484 |
| 9,153,399 | B2 * | 10/2015 | Afshari .................. | H01H 33/08 |
| 2010/0170876 | A1 | 7/2010 | Bach et al. | |

\* cited by examiner

ARC EXTINGUISHING GAS FILTERING DEVICE FOR ELECTRICAL CURRENT SWITCHGEAR AND ELECTRICAL CURRENT SWITCHGEAR COMPRISING THIS FILTERING DEVICE

The invention relates to an arc extinguishing gas filtering device for an electrical current switchgear. The invention also relates to an electrical current switchgear comprising such a filtering device.

In the field of separable electrical contact electrical current switchgear, such as circuit breakers or contactors, it is known to use filtering devices which are arranged at evacuation channels at the outlet of electrical arc extinguishing chambers. The aim of these filtering devices is to cool and cleanse the arc extinguishing gases which are given off when the current is switched. These arc extinguishing gases result from the occurrence of an electrical arc which is formed between the separable electrical contacts at the moment of the separation thereof. The arc extinguishing gases given off in this manner have a high temperature, generally greater than 4000° C., and further have a high pressure. It is therefore necessary, for safety reasons, to cool and cleanse these arc extinguishing gases when they are evacuated from the housing of the electrical unit, in particular to prevent loopback of the electrical current outside the switchgear.

Many filtering devices used to achieve this aim are known, but they have disadvantages which make them prohibitive in certain uses.

For example, it is known to use filtering devices comprising silicon carbide-based ceramic foams, or alumina-based porous ceramics. However, such devices can lead to the separation of insulating particles which spread toward the inside of the switchgear and which can hinder the proper operation thereof.

Also known are filtering devices based on screens comprising rep structure metallic cloths, for example those described in the U.S. Pat. No. 5,889,249 A. However, such filtering devices include multilayer stacks of such metallic cloths having, through the very structure thereof, a large spatial requirement and further require, for the manufacture thereof, outer shaping.

Moreover, such filtering devices are generally used in conjunction with insulating elements, such as screens or gas diffusers, with the aim of preventing the loopback of an electrical current. However, such devices bring additional structural and volume constraints and do not provide sufficient cooling when they are used with contemporary switchgear having high levels of power. This is particularly the case of the devices described in the patent EP 437 151 B1.

The invention therefore aims more particularly to overcome these disadvantages, by proposing an arc extinguishing gas filtering device for an electrical current switchgear, which is easy to produce and is more compact, while being able to be integrated within existing switchgear that can have complex forms.

To this end, the invention relates to an arc extinguishing gas filtering device for an electrical current switchgear, this filtering device comprising:
  a porous central body including longitudinal channels and transverse channels which fluidically connect the longitudinal channels together, the longitudinal channels having a bent form; and
  a tight outer skin which surrounds the central body and which comprises inlet orifices and outlet orifices, each longitudinal channel extending between an inlet orifice and an outlet orifice, the outer skin and the central body forming a rigid part in a single piece, which rigid part is produced in a metallic material.

According to advantageous but non-compulsory aspects of the invention, such a filtering device can incorporate one or more of the following features, taken separately or according to any technically acceptable combination:
  The longitudinal channels have a varying diameter.
  The diameter of the outlet orifice is less than the diameter of the corresponding inlet orifice, the inner diameter of the longitudinal channel which opens onto the inlet and outlet orifices reducing from the inlet orifice toward the outlet orifice.
  The device comprises outer faces with a bent form, the curvature of the longitudinal channels being adjusted according to the curvature of said outer faces.
  The metallic material is an Inconel alloy.
  The outer volume of the filtering device, defined by the outer faces of the filtering device, is less than or equal to 100 cm$^3$.
  The fill rate of the filtering device is between 5% and 60%, this fill rate being defined as being equal to the ratio of the volume occupied by material within the filtering device, to the total volume occupied by the filtering device, this total volume being equal to the volume defined by the outer faces of the filtering device.
  The filtering device is manufactured by means of an additive manufacturing method using direct metal laser melting.

Finally, according to another aspect, the invention relates to an electrical current switchgear, this switchgear including:
  separable electrical contacts;
  at least one electrical arc quenching chamber, provided inside the switchgear and including a stack of arc separating plates intended to quench an electrical arc that appears when the electrical contacts are separated, this arc extinguishing chamber being fluidically linked to the outside of the switchgear by an arc extinguishing gas evacuation channel;
  an arc extinguishing gas filtering device, mounted in the evacuation channel.

The filtering device is in accordance with a device as described above.

The invention will be better understood and other advantages thereof will emerge more clearly upon reading the following description of an embodiment of an arc extinguishing gas filtering device, which description is given solely by way of example and with reference to the appended drawings wherein:

FIG. 1 schematically represents, according to a lateral sectional view, an air electrical current switchgear having separable electrical contacts comprising a filtering device according to the invention;

Figure 1:
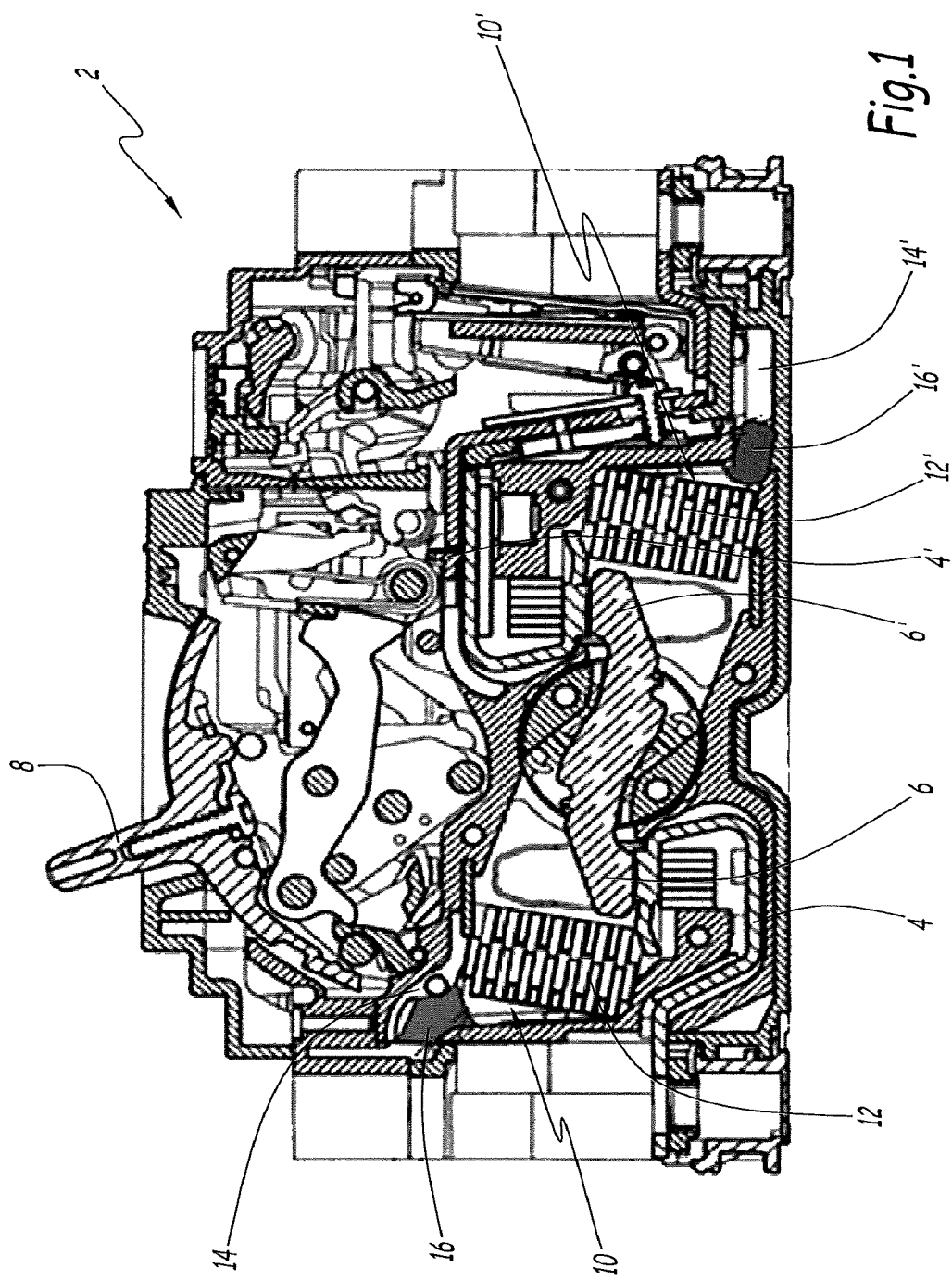
FIG. 1 represents an air switching and separable electrical contact electrical current switchgear 2.

In this example, the switchgear 2 is a high intensity and low voltage direct current single-pole circuit breaker. For example, the switchgear 2 is suitable for operating with electrical voltages less than 1500 volts DC and with short circuit electrical currents with an intensity greater than or equal to 1 kA. In an alternative, the switchgear 2 can be an alternating current circuit breaker.

In an alternative, the switchgear 2 can be different. For example, it can be a contactor. It can also be a multipolar unit.

The switchgear 2 is intended to be joined to an electrical circuit to protect it against electrical faults, such as a short circuit or an overcurrent.

To this end, the switchgear 2 comprises separable electrical contacts, in this case produced by associating fixed electrical contacts 4 and 4' rigidly connected to a frame of the switchgear 2 and mobile electrical contacts 6 and 6' that can be moved with respect to the fixed contacts 4 and 4'.

The movement of the mobile electrical contacts 6 and 6' is provided by means of a control mechanism which is not described in greater detail hereafter. This control mechanism can be actuated either manually by an operator, in this case by means of a control lever 8 located at the front of the switchgear 2, or by automatic tripping, in the case of an electrical fault detected by means of a detector integrated in the switchgear 2, such as a thermal and/or magnetic detector.

The fixed electrical contacts 4 and 4' are electrically connected to connection terminals of the switchgear 2.

When the switchgear 2 is in a closed state, the mobile contacts 6 and 6' are in electrical contact with the fixed contacts 4 and 4' and therefore cause an electrical current to circulate within the switchgear 2. When the switchgear 2 is in an open state, the mobile contacts 6 and 6' are distanced from the fixed contacts 4 and 4' in order to prevent the circulation of an electrical current.

The switchgear 2 also comprises arc extinguishing chambers 10 and 10', the function of which is to quench an electrical arc when the switchgear 2 is switched to the open state thereof while an electrical current is circulating. Each arc extinguishing chamber 10, 10' is thus, in this example, associated with and positioned facing a contact area between a fixed contact 4 and a mobile contact 6.

The arc extinguishing chambers 10 and 10' each comprise an arc extinguishing plate or metal sheet stack 12 and an evacuation channel 14 for evacuating the arc extinguishing gases which opens at the outside of the housing of the switchgear 2. The function of the plates of the stack 12 is to quench the electrical arc by splitting it into a plurality of separate arcs between the plates. The function of the evacuation channel 14 is to evacuate the arc extinguishing gas generated by the electrical arc out from the switchgear 2.

In practice, the arc extinguishing gases can only escape outside the switchgear 2 by means of the channels 14 and 14'. For example, the switchgear 2 is defined by a gas-tight moulded housing.

The switchgear 2 also comprises a filtering device 16 inserted into the evacuation channel 14, the function of which is to cool and cleanse the arc extinguishing gases during the evacuation thereof.

The arc extinguishing chambers 10 and 10' are identical in this case. The arc extinguishing chamber 10' particularly comprises a stack 12', an evacuation channel 14' and a filtering device 16' which are similar to the stack 12, to the evacuation channel 14 and to the filtering device 16, respectively. In particular, the filtering device 16' is similar to the filtering device 16 and provides the same functions with respect to the evacuation channel 14'. The filtering device 16' can, however, have a different form and/or different dimensions to those of the filtering device 16.

Figure 2:
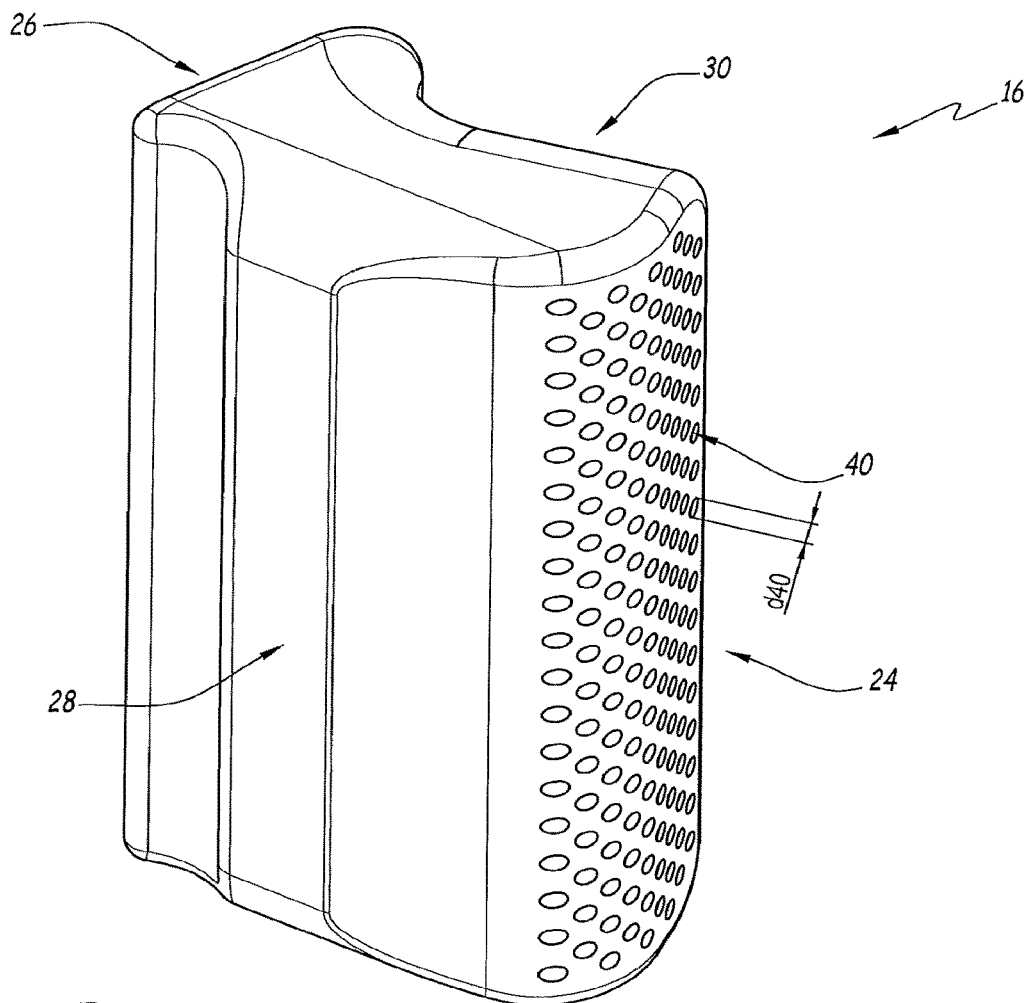
FIG. 2 is a schematic representation, according to a perspective view, of an arc extinguishing gas filtering device according to the invention, with which the switchgear of FIG. 1 is supplied.
Figure 3:
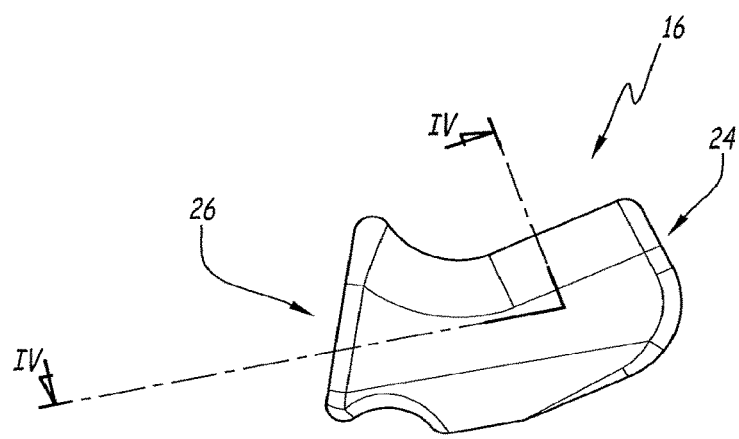
FIG. 3 is a schematic representation, according to a top view, of the filtering device of FIG. 2.
Figure 4:
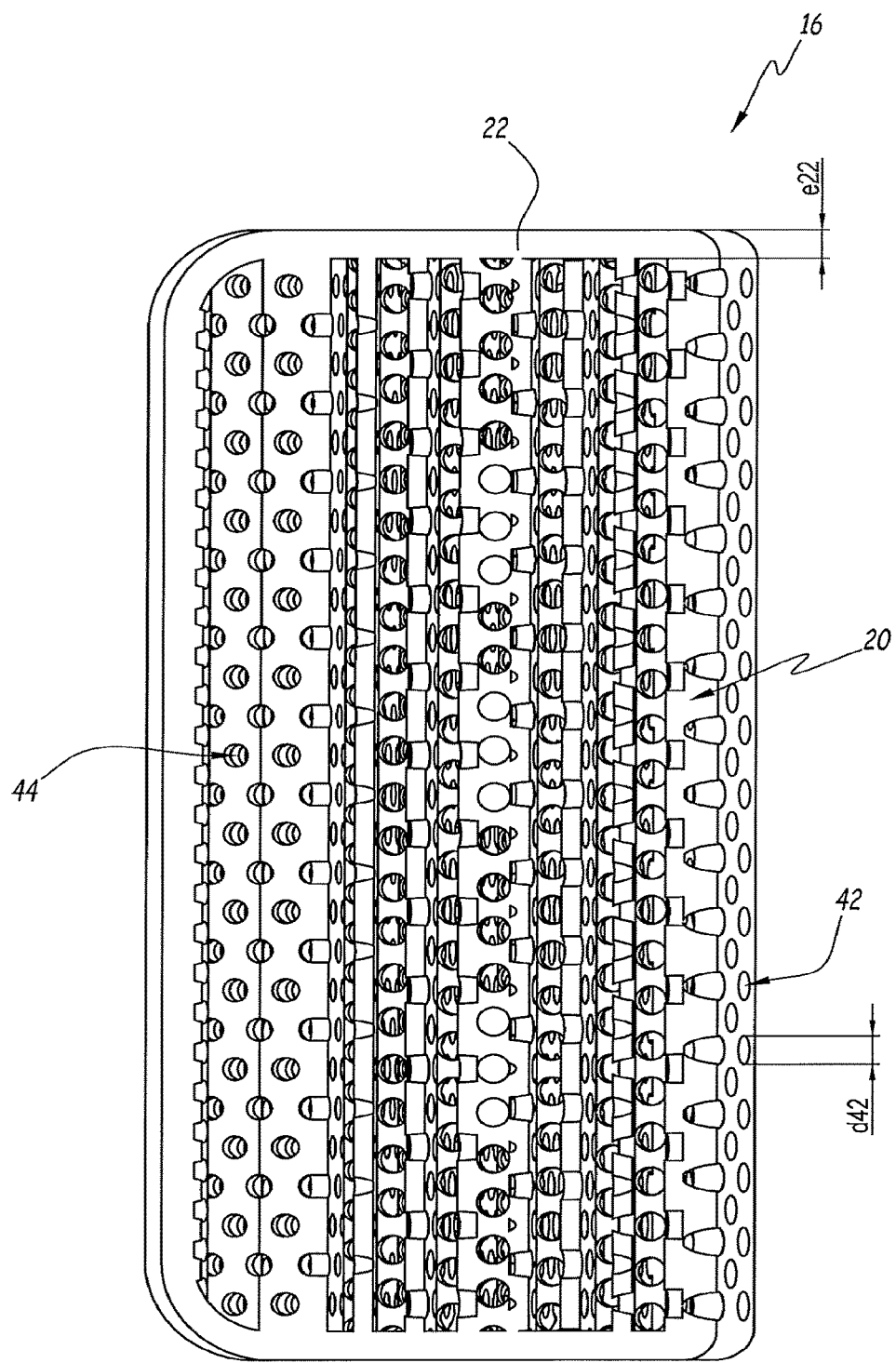
FIG. 4 is a schematic representation of the filtering device of FIG. 3, according to a view in the cutting plane IV-IV.
Figure 5:
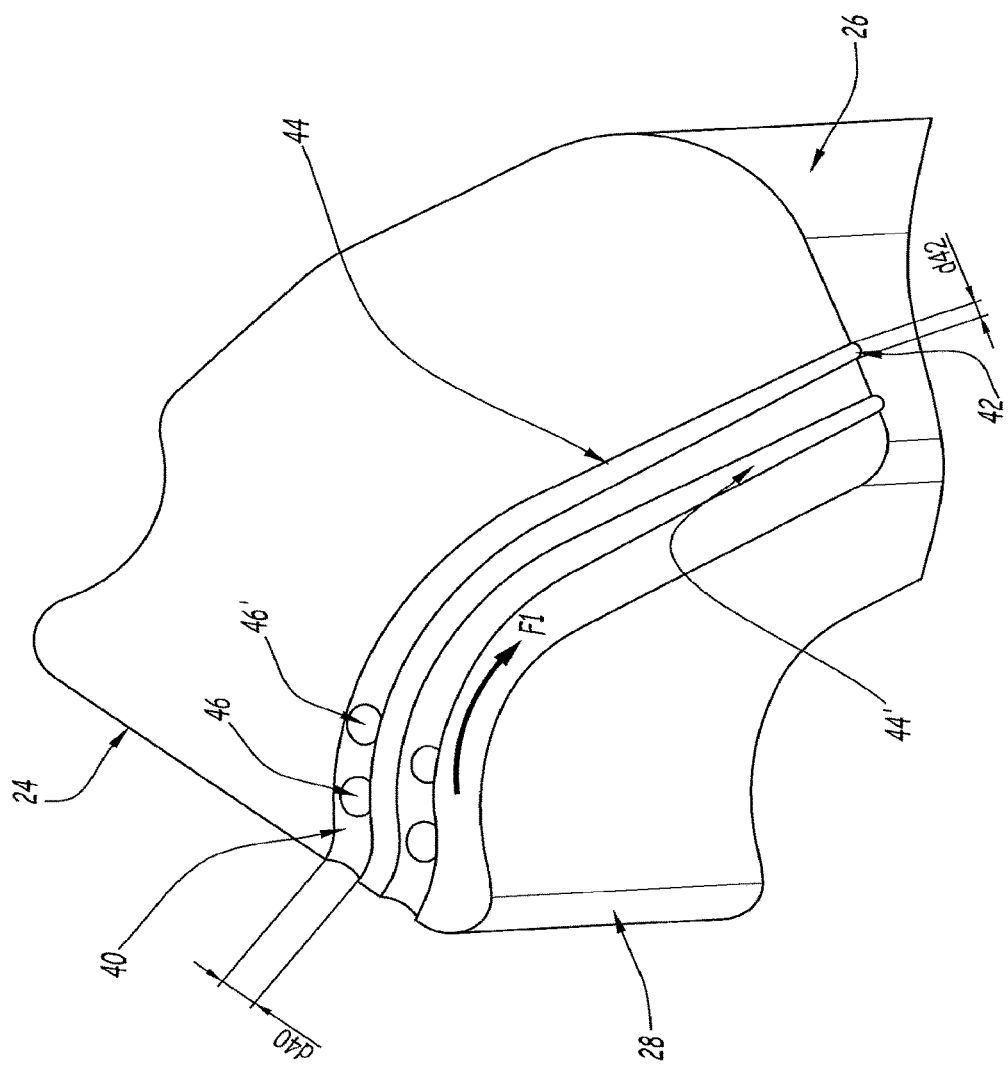
FIG. 5 is a schematic representation, according to a sectional view, of a portion of the filtering device of FIG. 2.

As illustrated in FIGS. 2-5, the filtering device 16 comprises a porous central body 20 and an outer skin 22 which surrounds the central body 20.

The filtering device 16 has a three-dimensional form and is defined by outer faces. In this example, the outer faces of the filtering device 16 particularly comprise a front face 24, a rear face 26, a lower face 28, and an upper face 30 and side faces, which are not detailed.

For example, the outer volume of the filtering device, defined by the faces of the filtering device, is less than or equal to 100 cm$^3$.

In this description, the terms "front" and "rear", as well as the terms "inlet" and "outlet" are defined with reference to the circulation direction of the arc extinguishing gases when the latter escape toward the outside of the switchgear 2.

The filtering device 16 is tightly mounted inside the evacuation channel 14 such as to occupy the entire section of this evacuation channel 14. Thus, the arc extinguishing gases circulating in the evacuation channel 14 are forced to pass through the filtering device 16.

In this case, the filtering device 16 is mounted by fitting within the evacuation channel 14.

In this example, the filtering device 16 has rounded faces which can be concave and/or convex. This allows the filtering device 16 to be inserted within the evacuation channel 14 of an existing switchgear or to be incorporated within ranges of already existing switchgear without having to change the architecture thereof.

Indeed, the evacuation channels 14 and 14' typically have complex and non-straight forms. The known filtering devices generally have form constraints, forcing them to be produced in planar form and/or with a large spatial requirement. This requires the channels 14 and 14' to be dimensioned as a result. The filtering device 16 does not have these disadvantages and is, therefore, easy to integrate within the switchgear 2.

The filtering device 16 has inlet orifices 40 provided on the front face 24 of the filtering device 16 and also has outlet orifices 42 provided on the rear face 26 of the filtering device 16. The front 24 and rear 26 faces are opposite one another and are each arranged such as to occupy the corresponding section of the evacuation channel 14 when the filtering device 16 is mounted within the switchgear 2. In other words, the arc extinguishing gases penetrate inside the filtering device 16 via the orifices 40 and exit therefrom via the outlet orifices 42.

d40 denotes the inlet diameter of the inlet orifices 40 and d42 denotes the diameter of the outlet orifices 42. In this example, the inlet orifices 40 all have the same diameter and are identical with one another. Likewise, the outlet orifices 42 have the same diameter and are identical with one another.

The diameter d40 of the inlet orifices 40 is preferably different to the diameter d42 of the outlet orifices 42.

For example, the diameter d40 is greater than the diameter d42. In this example, the diameter d40 is equal to 0.5 mm whereas the diameter d42 is equal to 0.4 mm.

The central body 20 comprises longitudinal channels each fluidically linking an inlet orifice 40 to an outlet orifice 42. These longitudinal channels in this case have the references 44 and 44'. Only two longitudinal channels are thus referenced in FIGS. 2-5 but, in practice, the filtering device 16 comprises more than two longitudinal channels 44 and 44'.

The longitudinal channels 44 and 44' advantageously have a varying diameter, i.e. a diameter having a value that is not constant over the length of the longitudinal channel. In practice, when the diameter d40 is greater than the diameter d42, the longitudinal channel 44, 44' has a diameter which reduces from the inlet orifice 40 toward the outlet orifice 42.

Advantageously, the longitudinal channels 44 and 44' have a bent form, which is adjusted depending on the curvature of the outer faces. For example, the route of the channels 44, 44' at least partially follows the bent form of the walls 28 or 30. For example, they are bent by following a longitudinal axis of convex form on the lower face which has a convex form. In practice, the channels 44 and 44' extend in this case, at the ends thereof, perpendicular to the front 24 and rear 26 faces.

The bent form of the longitudinal channels 44 and 44' firstly makes it possible to match as closely as possible the outer form of the filtering device 16, thus facilitating the incorporation thereof within the switchgear 2, and also makes it possible to avoid the inlet 40 and outlet 42 orifices associated with this longitudinal channel 44, 44' from being aligned and facing one another. This reduces the risk of loopback of the electrical current between the circuit breaker, the metallic masses, connecting active conductors and between phases, without it being necessary to produce baffles within the longitudinal channels, which would result in increasing the spatial requirement of the filtering device 16.

The bent form of the longitudinal channels 44 and 44' also makes it possible to provide an arc extinguishing gas path length that is sufficient to provide satisfactory cooling.

Furthermore, the central body 20 comprises transverse channels 46 and 46' which extend perpendicular to these longitudinal channels 44 and 44' within the central body 20, fluidically connecting the longitudinal channels 44 and 44' together.

For example, the transverse channels 46 and 46' have a constant diameter over the entire length thereof. Preferably, this diameter is equal to the diameter of the longitudinal channels 44 and 44' that they intercept, i.e. to which they are perpendicular.

For example, when the longitudinal channel 44 has a diameter which decreases over the length thereof from a first diameter value toward a second diameter value, then the transverse channels 46 and 46' which are located close to the inlet orifice 40 have a diameter equal to the first value, and the transverse channels 46 and 46' which are located close to the outlet orifice 42 have a diameter equal to the second value.

The porosity of the central body 20 is thus caused by the presence of the transverse channels and of the longitudinal channels joined together.

The transverse channels 46 and 46' make it possible to balance the flow of the arc extinguishing gases in the case of local clogging of one or more of the longitudinal channels 44 and 44'. Indeed, the arc extinguishing gas is typically loaded with metallic particles which are redeposited on the walls of the longitudinal channels during the circulation thereof, which can lead to a reduction in the diameter, or even clogging of the channels.

Preferably, the material fill percentage of the filtering device 16 is greater than or equal to 5% and less than or equal to 60%, this fill rate being defined as being equal to the ratio of the volume occupied by material within the filtering device 16, to the total volume occupied by the filtering device 16, this total volume being equal to the volume defined by the outer faces of the filtering device 16. In this example, the material fill rate is equal to 35%.

Thus, the porosity of the filtering device 16 is between 40% and 95%.

The outer skin 22 is tight, i.e. it prevents the arc extinguishing gases from passing out of the inlet holes 40 and the outlet holes 42 provided to this end.

The central body 20 and the outer skin 22 are produced in a single piece from a same medium, in this case in a metallic material.

In this example, an Inconel alloy 718, of formula Ni Cr19 Fe19 Nb5 Mo3, is used.

The thickness e22 of the outer skin 22 is less than or equal to 5 mm, preferably less than or equal to 1 mm. By way of illustration, in this example, the thickness e22 of the outer skin 22 is equal to 0.5 mm.

Preferably, the filtering device 16 is produced by means of an additive manufacturing technique, also called 3D printing, such as direct metal laser sintering, also known by the acronym DMLS.

This manufacturing technique is particularly advantageous, since it makes it possible to obtain a part of complex form with outer walls that can have a bent form and also makes it possible to produce the longitudinal channels of bent form and/or with varying diameter, all this with an extremely precise manufacturing tolerance, which can be approximately 0.05 mm. Thus, in light of the small dimensions of the diameters d40 and d42, the additive manufacturing technique makes it possible to obtain a precision and a compliance with the manufacturing tolerances that cannot be obtained simply with conventional techniques for manufacturing metal parts, such as moulding or machining. In particular, the technique makes it possible to easily create internal cavities and undercuts inside the central body 20 with satisfactory precision.

In this manner, the filtering device 16 can be manufactured according to the features of the switchgear 2 and particularly according to the geometry of the evacuation channels 14 and 14'. Thanks to the compactness of the filtering device 16 and to the flexibility of this manufacturing technology, the filtering device 16 can be incorporated within existing ranges of switchgear 2 or within an already existing switchgear 2 without it being necessary to change the geometry and/or the architecture of the switchgear 2 and particularly to change the geometry of the evacuation channel 14, 14'.

An example of manufacturing the filtering device 16 is now described.

Initially, prior to the start of manufacturing, a digital three-dimensional model of the filtering device 16 to be constructed is acquired.

The manufacturing tool particularly comprises a high-power laser, such as an optical fibre laser which can emit a power of 200 Watts to 400 Watts.

This laser is suitable for providing a controllable position and direction and intensity laser beam.

The tool also comprises a platform including two separate tanks, the bottom of which can be placed vertically using a piston.

The platform is, in this case, fixed but, in an alternative, can be moved with respect to the laser in a controlled fashion, for example by means of actuators, the laser then being able to be fixed.

The first tank is filled with a metallic powder of the medium being used to manufacture the filtering device 16, in the present case a powder of an Inconel alloy, whereas the second tank is initially empty.

Once the digital model has been acquired, this is subject to an automatic forming operation, for example produced by an electronic computer, which comprises cutting this digital model into a plurality of slices, or layers, having a fixed thickness. In this example, the thickness of each layer is chosen between 20 μm and 100 μm. A same thickness is chosen for all of the layers of the model.

A predetermined quantity of powder is automatically transferred from the first tank to the second tank, then the laser beam is moved by sweeping over this layer of powder such as to physically form a first layer of the filtering device 16. When the laser beam comes into contact with the metallic powder layer, the metallic powder particles melt locally at the point of impact with the laser ray then, by re-solidifying, form a layer which extends horizontally. When an already formed layer is present below, the particles also re-solidify to this already formed layer.

The filtering device 16 is thus formed by adding successive layers on top of one another. Once each layer is produced, a predetermined quantity of metallic powder is transferred again from the first tank to the second tank. The operations are thus repeated until the filtering device 16 has been completely manufactured.

The embodiments and the alternatives envisaged above can be combined with one another in order to produce new embodiments.

The invention claimed is:

1. An arc extinguishing gas filtering device for an electrical current switchgear, said filtering device comprising:
   a porous central body including longitudinal channels and transverse channels which fluidically connect the longitudinal channels together, the longitudinal channels having a bent form; and
   a tight outer skin which surrounds the central body and which comprises inlet orifices and outlet orifices, each longitudinal channel extending between an inlet orifice and an outlet orifice, the outer skin and the central body forming a rigid part in a single piece, wherein the rigid part is produced in a metallic material.

2. The arc extinguishing gas filtering device according claim 1, wherein the longitudinal channels have a varying diameter.

3. The arc extinguishing gas filtering device according to claim 1, wherein an outer diameter of the outlet orifice is less than an inner diameter of the corresponding inlet orifice, a diameter of the longitudinal channel which opens onto the inlet and outlet orifices reducing from the inlet orifice toward the outlet orifice.

4. The arc extinguishing gas filtering device according to claim 1, comprising outer faces with a bent form, a first curvature of the longitudinal channels being adjusted according to a second curvature of said outer faces.

5. The arc extinguishing gas filtering device according claim 1, wherein the metallic material is an Inconel alloy.

6. The arc extinguishing gas filtering device according to claim 1, wherein an outer volume of the filtering device, defined by outer faces of the filtering device, is less than or equal to 100 cm$^3$.

7. The arc extinguishing gas filtering device according to claim 1, wherein a fill rate of the filtering device is between 5% and 60%, the fill rate being defined as being equal to a ratio of a volume occupied by material within the filtering device, to a total volume occupied by the filtering device, the total volume being equal to the volume defined by outer faces of the filtering device.

8. The arc extinguishing gas filtering device according to claim 1, wherein the filtering device is manufactured with an additive manufacturing method using direst metal laser melting.

9. An electrical current switchgear, said switchgear comprising:
   separable electrical contacts;
   at least one electrical arc quenching chamber including a stack of arc separating plates intended to quench an electrical arc that appears when the electrical contacts are separated, said arc extinguishing chamber being fluidically linked to an outside of the electrical current switchgear by an arc extinguishing gas evacuation channel; and
   the arc extinguishing gas filtering device according to claim 1.

* * * * *